United States Patent [19]

Ross

[11] 3,962,795
[45] June 15, 1976

[54] ERECTOR ASSEMBLY RETAINER FOR TELESCOPIC RIFLE SIGHTS

[75] Inventor: Cecil J. Ross, El Paso, Tex.

[73] Assignee: W. R. Weaver Company, El Paso, Tex.

[22] Filed: June 9, 1975

[21] Appl. No.: 584,798

Related U.S. Application Data

[63] Continuation-in-part of Ser. No. 566,855, April 10, 1975, abandoned.

[52] U.S. Cl. .................................. 33/246; 33/248; 350/10
[51] Int. Cl.² ...................... F41G 1/38; G02B 27/36
[58] Field of Search ............ 33/245, 246, 247, 248; 350/10; 356/247

[56] References Cited
UNITED STATES PATENTS

| 2,045,670 | 6/1936 | Noske | 33/246 |
|---|---|---|---|
| 2,496,045 | 1/1950 | Ford | 33/248 |
| 2,949,816 | 8/1960 | Weaver | 33/245 |
| 3,184,852 | 5/1965 | Hageman | 350/10 |
| 3,429,634 | 2/1969 | Weaver | 33/246 |
| 3,484,148 | 12/1969 | Gotoh | 350/10 |

*Primary Examiner*—Richard E. Aegerter
*Assistant Examiner*—Richard R. Stearns
*Attorney, Agent, or Firm*—Donald R. Motsko; William W. Jones

[57] ABSTRACT

A one piece retaining member for use in a telescopic sight for imparting pivotal movement to an erector lens assembly. The erector lenses are housed in a tubular housing contained in the barrel of the sight. The retaining member includes means forming a pivot for the erector tube and means forming spring fingers for biasing the erector tube about the pivot.

6 Claims, 6 Drawing Figures

ERECTOR ASSEMBLY RETAINER FOR TELESCOPIC RIFLE SIGHTS

This invention is a continuation-in-part of my copending Ser. No. 566,855 filed Apr. 10, 1975, now abandoned.

This invention relates to a spring member for use in a telescopic sight for imparting pivotal movement to the erector lens system of the sight.

In modern day telescopic gunsights the erector lens system is used in making windage and elevation adjustments to zero in the sight on the gun with which it is used. The erector lenses, or one of them, is mounted in a tubular housing positioned inside of the main sight barrel. Means are provided for pivoting the erector lens housing about one of its ends, generally its rearward end, so that the target image viewed will move laterally of the reticle thus resulting in alignment of the point of impact of a projectile with the reticle aiming point of the sight.

To accomplish the pivotal movement of the erector lens tube, the prior art has provided: (1) a pivot member at one end of the erector tube by which the tube may be universally pivoted with respect to the sight barrel; (2) separate spring means engaging the sight barrel and erector tube at a point longitudinally spaced apart from the pivot member to impart pivotal moment to the erector tube; and (3) windage and elevation adjustments which engage the erector tube and are movable so as to impart pivotal movement of the erector tube against the bias of the spring means. In order to functionally operate properly, the pivoting system must also prevent longitudinal and rotational movement of the erector tube so as to ensure proper optical characteristics for the sight.

By employing separate pivot members, springs, fastening members, and the like, the prior art systems have proven to be expensive, awkward, and difficult to assemble and disassemble.

In order to overcome the disadvantages of the prior art assemblies while maintaining all of their advantages, I propose the use of a single one-piece retaining member which forms a pivot for the erector lens tube, biases the erector lens tube about the pivot, and prevents longitudinal and rotational movement of the erector lens tube within the main barrel of the sight. The retaining member of this invention is formed from a single piece of sheet spring steel which is curved so as to fit snugly within and conform for the most part to the curvature of the main sight barrel. The erector lens tube fits inside of the retaining member, there being a pivot formed on the retaining member, which pivot engages the erector lens tube at one of its ends. Spring fingers are formed as an integral part of the retaining member at a location spaced longitudinally away from the pivot, the spring fingers being formed with an increased curvature so as to engage the erector tube at points spaced longitudinally from the pivot to impart pivotal bias to the erector tube about the pivot. The spring fingers permit necessary outward movement thereof with respect to the sight barrel in response to inward movement of conventional windage and elevational adjustment screws mounted on the sight barrel, and imparts return movement of the erector lens tube in response to outward movement of the windage and elevation adjustments.

It is, therefore, an object of this invention to provide a unitary device for positioning an erector lens tube within the main barrel of a telescopic gun sight.

It is a further object of this invention to provide a device of the character described having integral pivot means formed thereon for pivot-enabling securement to the erector lens tube.

It is a further object of this invention to provide a device of the character described having integral spring fingers formed thereon for engagement with the erector lens tube at a point longitudinally spaced-apart from the pivot means for imparting pivotal moment to the erector lens tube.

It is yet another object of this invention to provide a device of the character described wherein the device acts positively to hold the erector lens tube within the main sight barrel against longitudinal and rotational movement.

These and other objects and advantages of the invention will become more readily apparent to those skilled in the art from the following detailed description of one embodiment of the device of this invention taken in conjunction with the accompanying drawings, in which.

Figure 1:
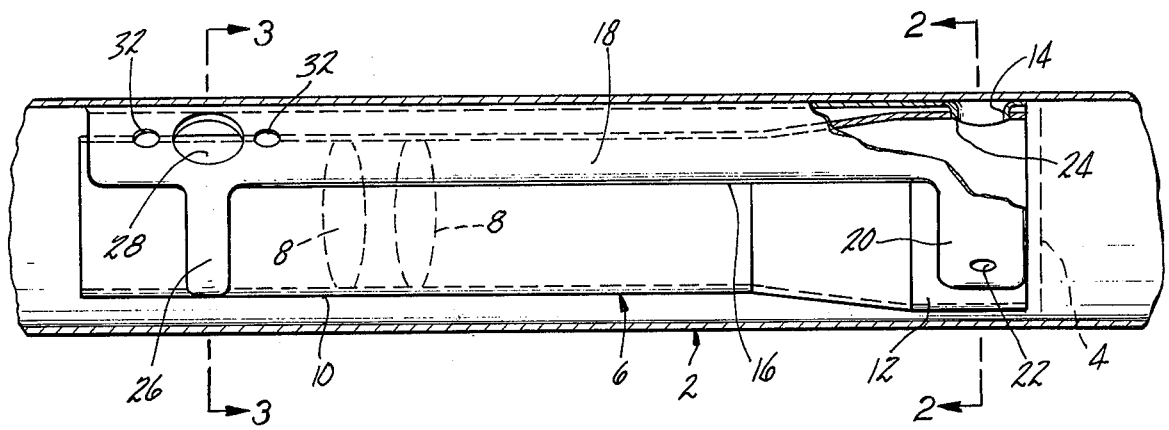
FIG. 1 is a side partially sectioned view of one embodiment of a device formed in accordance with this invention shown mounted in a sight barrel and holding an erector tube in place within the barrel.

Referring now to the drawings, FIG. 1 illustrates a fragmented telescopic gunsight with parts removed for clarity. The sight, or scope, includes a main barrel 2 at the ends of which are mounted objective and ocular lenses (not shown). As shown in FIG. 1, the right-hand end of the scope is the ocular end and the left-hand end is the objective end. A reticle 4 is mounted in the barrel 2 at the second focal plane of the instrument. An erector tube 6 is mounted in the barrel 2 and contains a pair of erector lenses 8. The erector tube 6 includes a forward cylindrical portion 10 and a rearward outwardly flared portion 12. A laterally extending circular opening 14 is formed in the flared part 12 of the erector tube 6.

Figure 4:
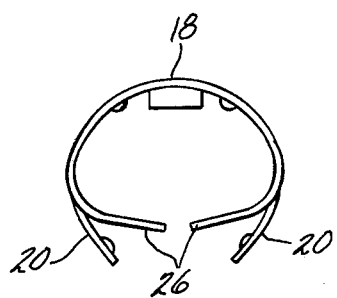
FIG. 4 is an elevational view of the left hand end of the retaining device as shown in FIG. 1 with the erector tube being omitted to show the non-stressed position of the spring fingers of the retaining device.
Figure 2:
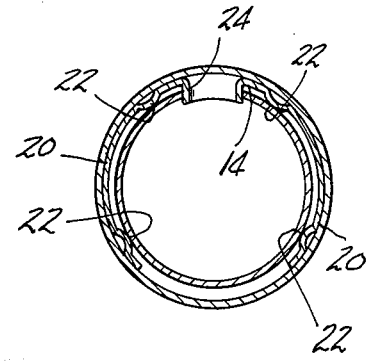
FIG. 2 is a vertical sectional view of the assembly of FIG. 1 taken along line 2—2 thereof.

The erector tube-retaining member is preferably made of a sheet of spring steel and is designated generally by the numeral 16 and includes a longitudinally extending bridge portion 18 which is formed with a radius of curvature which conforms substantially to the radius of curvature of the scope barrel 2. The bridge portion is sized so as to fit snugly within the scope barrel 2 and includes as an integral part thereof a rearward (ocular end) pair of tangs 20 which extend circumferentially from the bridge 18 and are snugly sandwiched between the scope barrel 2 and the flared end 12 of the erector tube 6. The tangs 20 are formed with a smaller radius of curvature than the bridge 18, as best shown in FIG. 4, so that when the flared portion 12 of the erector tube 6 is positioned within the tangs 20, the latter are stressed outwardly to grip the erector tube, within the retainer 6. The tangs 20 are formed with a plurality of dimples 22 which establish point contact between the retainer 16 and the flared end 12 of the erector tube 6 as best shown in FIG. 2. The rear (ocular) end of the bridge 18 is punched and curled radially inwardly to form a radially inwardly extending annular projection 24 which fits snugly within the erector tube opening 14 so as to form a pivot lug for the erector tube 6. It will be noted that the tangs 20 bias the projection 24 and opening 14 into snug engagement with each other to maintain the pivotal connection between the retainer 16 and the erector tube 6. It will also be noted that the projection 24-opening 14 connection prevents the erector tube 6 from moving longitudinally or rotationally with respect to the retainer 16, while at the same time allowing the pivotal movement referred to above.

The forward (objective) end of the bridge 18 is provided with integral circumferentially extending tangs 26. The tangs 26 are preferably formed as straight line members which connect to the bridge 18 at an area having a sharply reduced radius of curvature, as best shown in FIG. 4. The tangs 26 contact the forward (objective) end of the erector tube 6 and serve to bias the erector tube 6 about the pivot lug 24. The straight line configuration of the tangs 26 provides line contact between the tangs 26 and the cylindrical surface 10 of the erector tube 6, as best shown in FIG. 3.

Figure 3:
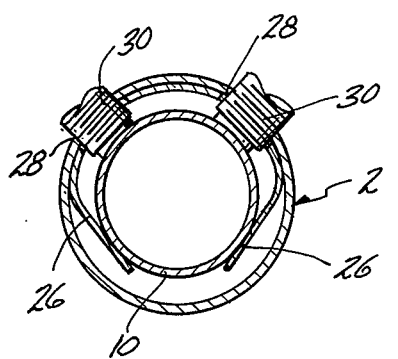
FIG. 3 is a vertical sectional view of the assembly of FIG. 1 taken along line 3—3 thereof.

The bridge 18 is formed with a pair of openings 28 through which extend windage and elevation screws 30, as shown in FIG. 3. The windage and elevation screws 30 contact the cylindrical part 10 of the erector tube 6 at points spaced apart 180° from the tangs 26. Thus each adjustment screw 30 cooperates with a respective one of the tangs 26 to impart pivotal movement to the erector tube 6 about the pivot lug 24, it being understood that one of the tangs 26 biases the tube 10 against a respective one of the adjustment screws 30. The adjustment screws are threadedly mounted in turrets (not shown) secured to the outside surface of the barrel 2. The bridge 18 is also provided with four threaded openings 32, disposed in pairs of two, with one of the openings 32 being disposed on either side longitudinally of the openings 28. The threaded openings are coaxial with slightly larger longitudinally elongated openings (not shown) in the barrel 2 and turrets (not shown) and receive small screws (not shown) which are used to clamp the turrets and retainer 16 to the barrel 2.

Figure 5:
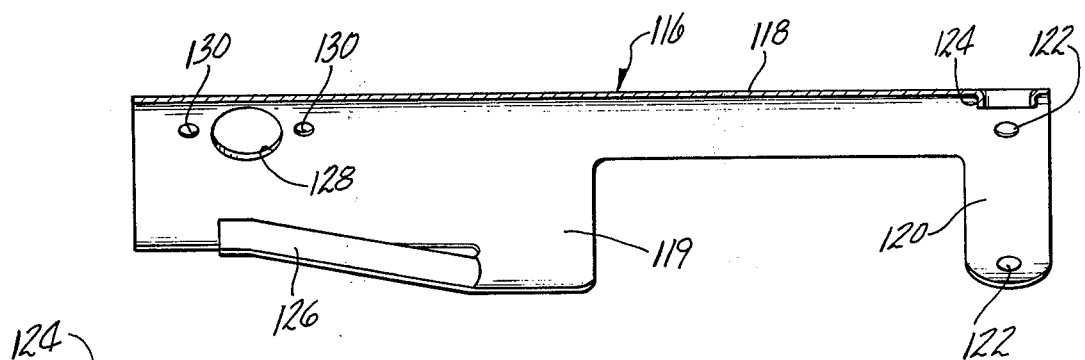
FIG. 5 is an axial sectional view of a second embodiment of a device formed in accordance with this invention wherein the axis of the erector pivot springs extends longitudinally of the device.
Figure 6:
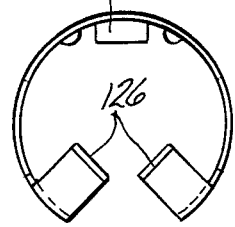
FIG. 6 is a left hand elevational view of the embodiment of FIG. 5.

Referring now to the embodiment of the invention shown in FIGS. 5 and 6, it will be understood that the retainer 116 fits inside of the scope barrel in generally the same manner as shown in the FIG. 1 embodiment. The retainer 116 includes a longitudinally extending bridge portion 118 which extends between a rearwardly disposed pair of circumferentially extending tangs 120 having a plurality of dimples 122 operative to grip the rearward end of an erector tube as previously described. A radially inwardly extending annular projection 124 forms a pivot lug for the erector tube as previously described. The forward end portion of the bridge 118 is circumferentially extended as at 119 to form a web which has the same radius of curvature as the inside of the scope tube and fits snugly therein. A pair of axially extending radially inwardly bent spring fingers 126 are formed integral and in one piece with the web 119 and extending forwardly therefrom. The spring fingers 126 engage the forward end of the erector tube and bias the latter pivotally about the lug 124. Forward openings 128 are provided for the windage and elevation screws, as are threaded openings 130 for reception of the securement screws (not shown).

It will be readily appreciated that the four screws will securely clamp the retainer in place within the scope barrel, and the retainer tangs and pivot lug will cooperate to hold the erector tube against longitudinal and rotational movement within the scope barrel. At the same time the erector tube will be free to pivot within the scope barrel. The one piece retainer construction permits much simplified assembly when compared to the prior art multi-piece assemblies. Assembly can be easily accomplished by first sliding the erector tube into engagement with the four tangs and then continuing such movement until the pivot lug enters the erector tube radial opening. This first assembly step will result in a locked retainer-erector assembly which is easily slid into the scope barrel until the four screw holes on the retainer are properly located. The adjustment turrets can then be properly positioned and the four securing screws installed to affix the erector assembly and turrets to the scope barrel. The adjustment screws can then be installed to enable proper pivotal alignment of the erector lenses.

Since many changes and variations of the disclosed embodiment of the invention may be made without departing from the inventive concept, it is not intended to limit the invention otherwise than as required by the appended claims.

What is claimed is:

1. A telescopic sight comprising a retaining member for use in securing an erector lens assembly pivotally within a telescopic sight barrel, said retaining member being formed in one piece having an elongated bridge portion, means forming a pivot disposed at one end of said bridge portion, first integral spring means formed in one piece with, and at, said one end of said bridge portion for biasing pivot-engagement means on an erector tube into engagement with said pivot, said pivot-engagement means being operative upon engaging said pivot to hold the erector tube against longitudinal and rotational movement with respect to said retaining member while permitting pivotal movement of the erector tube with respect to the retaining member, and second integral spring means formed in one piece with and at the other end of said bridge portion for biasing the erector tube into engagement with adjusting means carried by said telescopic sight barrel.

2. The telescopic sight of claim 1 further comprising means for fixedly securing said retaining member to the sight barrel.

3. The telescopic sight of claim 1, wherein said first spring means comprises a pair of first arcuate tangs depending from opposite sides of said bridge, and said second spring means comprises a pair of second tangs depending from opposite sides of said bridge.

4. The telescopic sight of claim 3, further comprising a plurality of dimples on said first arcuate tangs for establishing point contact between said first arcuate tangs and the erector tube.

5. The telescopic sight of claim 3, wherein said second tangs define a substantially planar surface and are connected to said bridge by relatively sharply radiused portions to provide substantially line contact between said second tangs and the erector tube.

6. The telescopic sight of claim 1, wherein said second spring means is a pair of longitudinally extending spring fingers circumferentially offset from said bridge and connected thereto by an arcuate web conforming generally to the radius of curvature of the sight barrel.

* * * * *